United States Patent
Sensel et al.

(10) Patent No.: US 6,639,894 B1
(45) Date of Patent: Oct. 28, 2003

(54) COMMUNICATIONS INTERCONNECT WITH MAKE-BEFORE-BREAK SIGNAL ROUTING

(75) Inventors: Steven Dale Sensel, Blue Ridge, TX (US); Jay Henry Dorval, Plano, TX (US); Khanh Quoc Nguyen, Allen, TX (US)

(73) Assignee: Metro-Optix, Inc., Allen, TX (US)

( * ) Notice: Subject to any disclaimer, the term of this patent is extended or adjusted under 35 U.S.C. 154(b) by 0 days.

(21) Appl. No.: 09/563,576

(22) Filed: May 3, 2000

(51) Int. Cl.$^7$ ................................................ H04L 1/00
(52) U.S. Cl. ..................... 370/217; 370/395.1; 370/401; 370/463
(58) Field of Search ................................ 370/217, 351, 370/359, 419, 235, 236, 423, 463, 395.1, 401; 379/93.05, 93.07

(56) References Cited

U.S. PATENT DOCUMENTS

| | | | |
|---|---|---|---|
| 4,559,421 A | | 12/1985 | Lapke et al. |
| 5,335,105 A | | 8/1994 | Carlton |
| 5,365,510 A | | 11/1994 | Nicholson et al. |
| 5,600,469 A | * | 2/1997 | Yamazaki .................... 359/135 |
| 5,923,851 A | * | 7/1999 | Gallagher et al. .......... 709/228 |
| 6,031,838 A | * | 2/2000 | Okabe et al. ................ 370/395 |
| 6,442,758 B1 | * | 8/2002 | Jang et al. ................... 725/119 |

* cited by examiner

Primary Examiner—Alpus H. Hsu
Assistant Examiner—Roberta Stevens
(74) Attorney, Agent, or Firm—Robert H. Frantz

(57) ABSTRACT

A primary communications interface card for receiving a signal is equipped with a bypass or shunting relay, the control of which is managed by a backup or protection interface card. The cable interconnect from far-end equipment to the primary interface card is provided with a make-before-break connector to the primary interface card, and a pig tail cable to the protection card. Upon command, the protection card may command the relay to shunt the signal from the far end equipment around the primary interface card to the protection card. Then, the cable may be disconnected from the primary interface card, with the make-before-break connector providing a signal path from the far-end equipment to the protection card before continuity through the shunting relay is lost. The primary interface card can then be removed and replaced, and the process reversed to redirect traffic to the primary interface card. Thus, the primary interface card is electrically or optically isolated, mechanically removed and replaced, and electrically or optically reconnected allowing continuous, uninterrupted service of the signal and traffic by the protection card during the maintenance action.

35 Claims, 3 Drawing Sheets

Figure 1 — Prior Art

COMMUNICATIONS INTERCONNECT WITH MAKE-BEFORE-BREAK SIGNAL ROUTING

TECHNICAL FIELD OF THE INVENTION

This invention pertains to the arts of high speed data and digital telephony interconnect, wiring, termination, and routing technologies, especially those technologies related to provision of redundant, switch-over, back-up or protection of critical interconnects.

CROSS-REFERENCE TO RELATED APPLICATIONS

None.

FEDERALLY SPONSORED RESEARCH AND DEVELOPMENT STATEMENT

This invention was not developed in conjunction with any Federally-sponsored contract.

MICROFICHE APPENDIX

Not applicable.

BACKGROUND OF THE INVENTION

High speed data and digital telelphony interconnection schemes are well-known within the art of data and telecommunications, including multi-megabit to gigabit-per-second data rates such as North American transmission standards including STS-1 electrical, STS-3 electrical, VT1.5 electrical, DS-1/T1, DS-3/T3, 25M asynchronous transfer mode ("ATM"), asynchronous digital subscriber line ("ADSL"), high-speed digital subscriber line ("HDSL"), and optical media such as OC-1, OC-3, OC-12, OC-48, OC-192, OC-768; international optical standard media such as synchronous digital hierarchy ("SDH") STM-1, STM-4, STM-16, and STM-64; various standards from the European Telecommunications Standards Institute ("ETSI") and the International Telecommunications Union ("ITU") E1 and E3; Japanese standards including J1 and J2; and local area network ("LAN") interfaces and transmission protocols such as EtherNet, Fast EtherNet, Giga-bit EtherNet, and Token Ring.

Because of the transmission line characteristic and signal integrity considerations necessary to successfully route and interconnect signals of these frequencies, great care must be taken to avoid termination impedance mismatches, unnecessary stubs, and cross talk. Most cabling and connectors used in these installations are either twisted-pair and/or shielded designs.

Turning to FIG. 1, a simple block diagram of a communications system is shown. In this case, the system has a shelf comprising two or more cards (11 and 12) and a backplane (10) into which the cards are installed. In this example, the signal cabling interconnect is made via "front panel" access, or on the side from which the cards are installed and removed. Signal cables are connected (13 and 14) to the cards (11 and 12) via signal connectors such as coaxial, twin-axial, tri-axial, twisted-pair or D-connectors.

If a card fails or otherwise needs to be replaced, it must be removed from the shelf from the front panel direction. This necessitates the disconnection of the signal cables, which requires the data or telecommunications traffic carried on those cables to be re-routed to other systems in order to avoid interruption of service. So, a technician or group of technicians would usually perform several system commands to re-route the traffic, disable the communications path, remove and replace the card, re-enable the communications path, and re-route the traffic to the new card.

In order to lessen the number of steps and time involved with this process, and increase the "availability time" of these systems, some systems provide for backup or redundant cards in the shelf. Typically, the backup or "protection" card is idle until placed into service as the result of needing to remove an active card. While this solution is a viable approach for system interconnection schemes which involve routing and interconnect of the signals to the cards via the backplane, it is not easily realizable with front-panel access systems. In front-panel access systems, the failed or removed card must be disconnected from the signal cable at some point, which causes an interruption in the service. However, many telecommunications systems operators, such as telephone companies, Internet service providers, and large privately-owned switch rooms, prefer the front-panel access arrangement for maintenance and installation reasons. Further, many countries, especially throughout Europe, specify and require systems to be provided with front-panel access.

Some schemes of protection interconnect have employed a split or "Y" connection to two terminators, as shown in FIG. 1. The primary terminator (11) line interface unit ("LIU") and the protection terminator (12) LIU impedances must be adjusted accordingly such that the two terminations presented in parallel meet the impedance of the cable (15). But, as the primary terminator is removed from the interconnect to allow connection of the replacement card or circuit, only the protection terminator is present on the signal, which may cause severe signal distortion and a impedance mismatch. At higher frequencies, the disconnected and un-terminated portion of the "Y" cable may also present undesirable stub characteristics.

This general mechanical and electrical representation can be applied to many systems, such as Private Branch Exchanges ("PBX"), data routers, Central Office switches, etc.

Therefore, there is a need in the art for a signal interconnection method and system which allows for the re-routing of a signal from a primary point of termination to a secondary point of termination, mechanical and electrical disconnection of the primary point of termination from the signal cable, mechanical and electrical connection of a replacement primary point of termination to the signal cable, and re-routing of the signal to the replacement point of termination. Further, there is a need in the art to maintain the termination impedance during all of these steps in order to maintain signal integrity. Finally, there is a need in the art for this system and method to allow continuous, uninterrupted service of the traffic carried on the signal cable.

SUMMARY OF THE INVENTION

The present invention is useful for data and telecommunications signals at all speeds and frequencies in the electrical domain, and also for signals in the optical domain, including STS-1 electrical, STS-3 electrical, VT1.5 electrical, DS-1/T1, DS-3/T3, 25M asynchronous transfer mode ("ATM"), asynchronous digital subscriber line ("ADSL"), high-speed digital subscriber line ("HDSL"), and optical media such as OC-1, OC-3, OC-12, OC-48, OC-192, OC-768; international optical standard media such as synchronous digital hierarchy ("SDH") STM-1, STM-4, STM-16, and STM-64; various standards from the European Telecommunications Standards Institute ("ETSI") and the International Telecommunications Union ("ITU") E1 and E3; Japanese standards including J1 and J2; and local area network ("LAN") interfaces and transmission protocols such as EtherNet, Fast EtherNet, Giga-bit EtherNet, and Token Ring.

A primary interface card for receiving a signal is equipped with a bypass or shunting relay, the control of which is managed by a backup or protection interface card. The cable interconnect from far-end equipment to the primary interface card is provided with a make-before-break connector to the primary interface card, and a pig tail cable to the protection card. Upon command, the protection card may command the relay to shunt the signal from the far end equipment around the primary interface card to the protection card. Then, the cable is unplugged from the primary interface card, with the make-before-break connector providing a signal path from the far-end equipment to the protection card before continuity through the shunting relay is lost. The primary interface card can then be removed and replaced, and the process reversed to redirect traffic to the primary interface card. Thus, the primary interface card is electrically or optically isolated, mechanically removed and replaced, and electrically or optically reconnected allowing continuous, uninterrupted service of the signal and traffic by the protection card during the maintenance action.

BRIEF DESCRIPTION OF THE DRAWINGS

The figures presented herein when taken in conjunction with the disclosure form a complete description of the invention, wherein elements and steps indicated by like reference indicators are the same or equivalent elements or steps.

DETAILED DESCRIPTION OF THE INVENTION

The invention presented herein is useful for systems involving low-speed signals, such as DS-1 and E1 at the mega-bit-per-second rates, as well as multi-Megabit-per-second rate signals such as DS3 and STS-1 and Gigabit data rates. The techniques and methods employed do not restrict the usefulness of the invention to only these data rates, but is equally applicable and useful for other data transmission types including STS-1 electrical, STS-3 electrical, VT1.5 electrical, DS-1/T1, DS-3/T3, 25M asynchronous transfer mode ("ATM"), asynchronous digital subscriber line ("ADSL"), high-speed digital subscriber line ("HDSL"), and optical media such as OC-1, OC-3, OC-12, OC-48, OC-192, OC-768; international optical standard media such as synchronous digital hierarchy ("SDH") STM-1, STM-4, STM-16, and STM-64; various standards from the European Telecommunications Standards Institute ("ETSI") and the International Telecommunications Union ("ITU") E1 and E3; Japanese standards including J1 and J2; and local area network ("LAN") interfaces and transmission protocols such as EtherNet, Fast EtherNet, Giga-bit EtherNet, and Token Ring.

The interconnection system and method disclosed maintains signal termination impedance throughout the process of switch over to the protection terminator, mechanical replacement of the primary terminator, and switch back to the primary terminator, with all access to cabling and cards being available to the front panel of the equipment shelf.

At higher data rates, such as DS-3 and above, maintaining signal integrity and a constant transmission impedance is critical—even during switch over and switch back between a primary terminator card and a protection or backup terminator card. As such, typical "Y" cabling schemes are not adequate.

Figure 1:
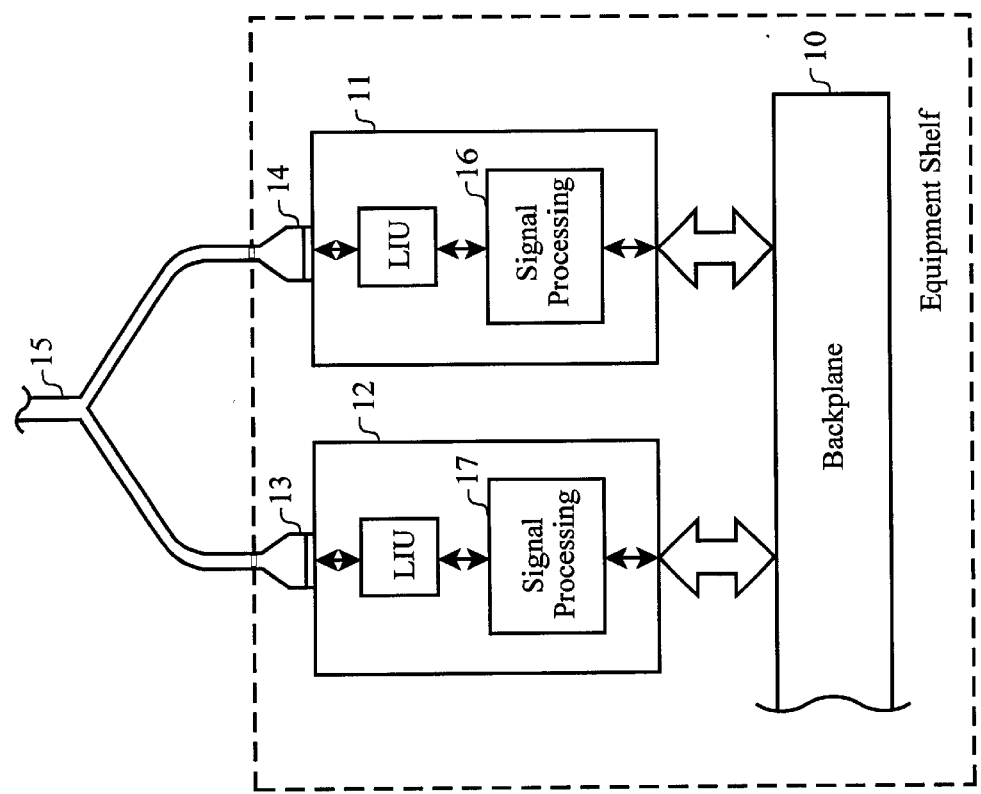
FIG. 1 presents the general mechanical and electrical structure of high-speed data and digital telephony systems including signal cables, cards, and backplane in a shelf.
Figure 2:
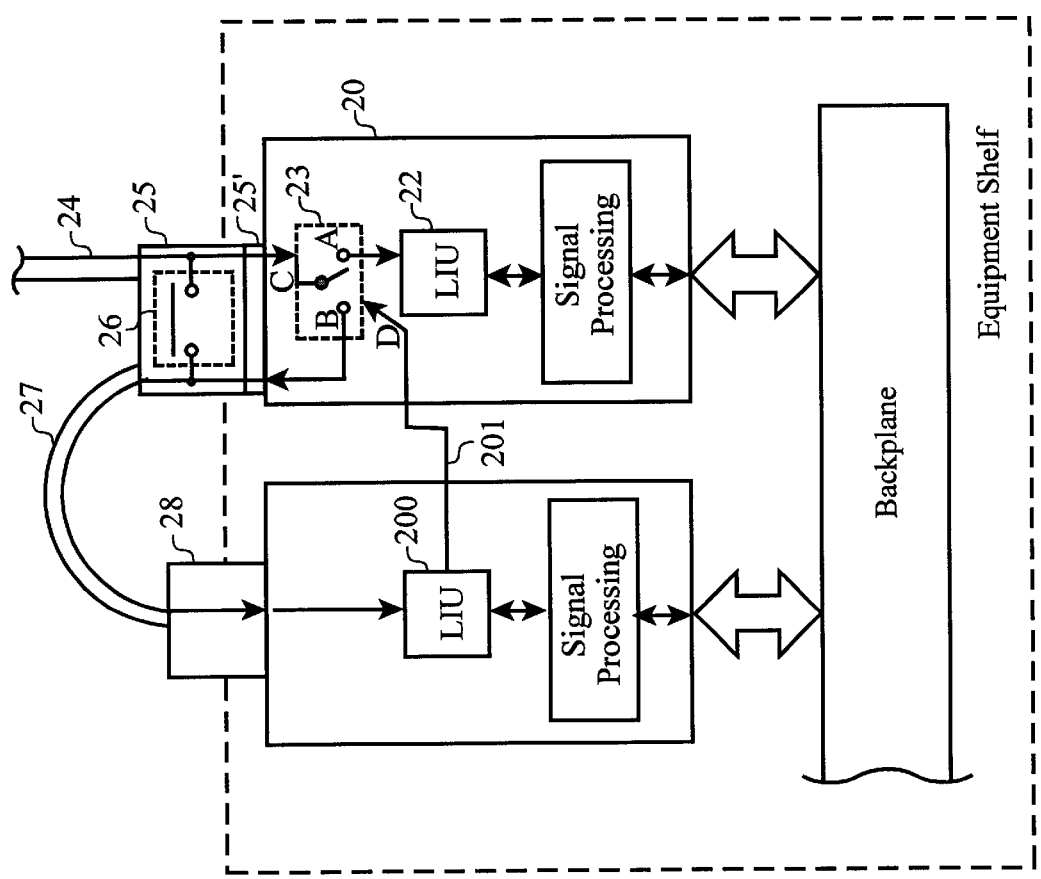
FIG. 2 shows in detail the interconnection scheme of the invention, including the use of a make-before-break connector, relay, and relay control signal, to allow cooperative interaction of the primary and protection cards.

Thus, the invention employs several elements cooperating to achieve the objectives of the invention, as shown in FIG. 2. The primary terminator card (20), such as a DS-3 line interface card, consists of a typical LIU (22) which is interconnected to its front panel cable connection via a relay (23). In its normal state, the relay (23) provides an electrical connection from the common terminal C to the A terminal. The signal cable is equipped with a make-before-break connector (25) which receives the signal cable (24) from another system or shelf. When the make-before-break connector (25) is mechanically mated to the primary terminator card connector, the signal is routed normally from the signal cable (24) to the relay (23) common terminal, and toward the primary LIU (22).

For protection functionality, the B terminal of the relay (23) is routed back out and through the connector of the signal cable (24) to a "pig tail" cable (27). The pig tail cable (27) then attaches (28) to the input of a protection or back up terminator card (21). The signal from the pig tail cable is routed directly to the protection LIU (200) on the protection card. A relay control signal (201) is provided from the protection card (21) to the relay control input D of the relay (23) on the primary card (20). Preferably, the relay control signal is routed through the backplane interfaces on both cards, but could just as well be routed back through the pig tail cable. The approach of routing the relay control signal through the pig tail cable supports introduction of this method into systems with existing or standardized backplanes, such as VMEbus or CompactPCI.

When the primary card is to be replaced or removed, the service personnel must first activate the protection card or otherwise enable it to handle the signal processing for the signal on the signal cable (24). In so doing, the protection card (21) will activate the relay control signal (201), which causes the relay (23) on the primary termination card to change from its normal state to a state in which it routes the signal from its common terminal C to its B terminal, thereby completing a signal path from the signal cable (24) through the relay (23) to the pig tail cable (27) to the protection LIU (200).

If the relay control signal is routed through the backplane, the cable is next disconnected from the primary card (20). The make-before-break connector (25) of the signal cable includes a relay which connects the signal path between the signal cable (24) and the pig tail cable (27) before the continuity between the signal cable (24) and the mating connector (25') on the card is broken. There are well-known connector several designs which achieve this, most commonly a set of leaf spring contacts which are separated upon mating and are normally closed when unmated. So, as the cable connector (25) is removed from the primary card (20), a signal path is established by the internal make-before-break structure (26) between the signal cable (24) and the pig tail cable (27) before the continuity between the signal cable (24) and the relay (23) or mating connector (25) is broken. Thus, as the cable is "unplugged" from the primary card, continuity of the signal to the protection LIU (200) is always maintained, whether through the relay (23) or the make-before-break structure (26) of the cable connector. Finally, the primary card is removed from its slot while the protection card provides continuous handling of the signal.

In the alternate embodiment whereby the relay control signal is routed through the pig tail cable, the primary card can be removed from the shelf and backplane before disconnecting the cable from the primary card as long as the relay control signal is sufficient to maintain the signal path connection through the relay (23). However, for certain high-speed signals, a solid-state relay or selector may be used as the relay, and thus may need various supply voltages which may only be present on the backplane and may be impractical to supply via the pig tail cable. In such a case, routing of the relay control signal over the backplane is probably preferable. In theory, this scheme can also be applied to optical interconnects, with appropriate connector or optical path selector devices employed in place of the electrical connectors and relays.

To install a replacement primary terminator card or to re-install the primary terminator card, the service technician may then install the card and plug the connector (25) onto it. Again, as the relay control signal is activated either through the backplane or pig tail cable, the newly installed primary card will not be immediately connected to the active signal but instead will be "shunted around" to the protection card (21). Last, the technician may re-enable the newly installed primary card and disable the protection card (21), which de-activates the relay control signal (201) and allows normal routing of the signal from the signal cable (24) to the primary LIU (22) on the newly installed card.

Figure 3:
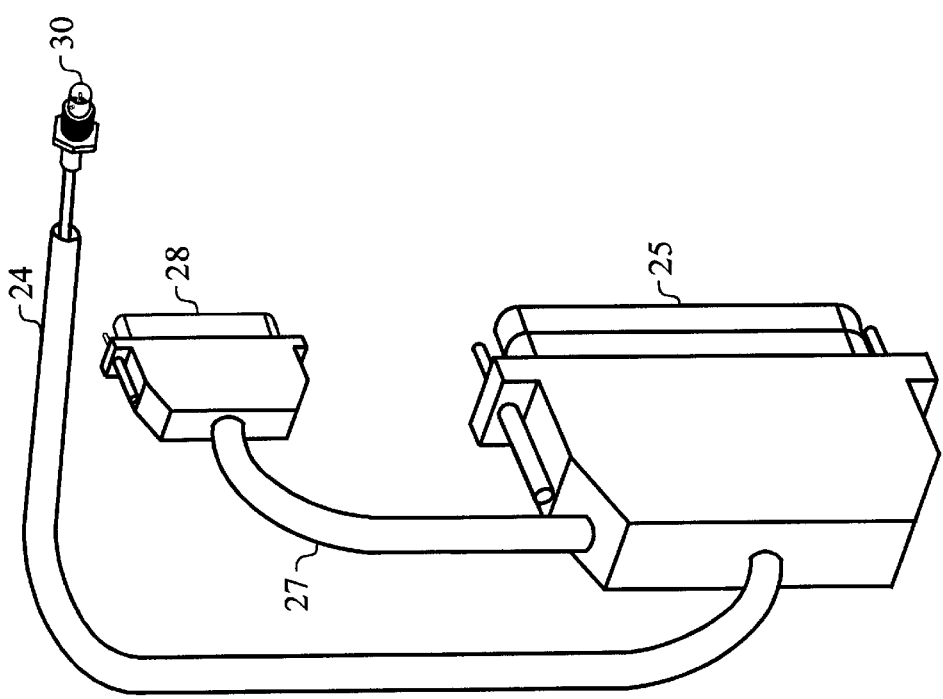
FIG. 3 depicts the preferred embodiment of a DS-3 signal cable incorporating the invention.

In the preferred embodiment for a DS-3 signal, the make-before-break connector is a Winchester part number MJ25C115644540 card edge connector. However, suitable alternates are available from other manufacturers. In the current embodiment for a DS-3 signal cable, as shown in FIG. 3, the signal cable (24) is terminated by one or more suitable connectors (30) for connection to the "far end" equipment shelf, such as male or female coaxial connectors, and the pig tail cable (27) is terminated by a standard connector such as a high-density crimp connector, such as a 26-pin Amp model 748365-1. Suitable coax or twisted pair cable, such as 75 Ohm coax, is used for both the signal cable (24) and pig tail cable (27). Alternate make-before-break connectors, cable, and far-end equipment terminating connectors must be selected depending on signal type and speed, but these types of connectors and wiring are well-known within the art and are often specified by various standards bodies such as the International Telecommunications Union ("ITU"), Bellcore (more recently known as Telecordia), or the American National Standards Institute ("ANSI").

While the disclosure contained herein has set forth a preferred embodiment of the invention, and the fundamental components used within the invention are well-known within the art, it will be appreciated by those who are skilled in the art that variations to the combination of elements and steps disclosed can be made without departing from the scope and spirit of the invention. Such variations may include, but are not limited to, selection of alternate cable types, connector types, and relays or signal selectors, to enable the invention to be useful for high-rate electrical signals as well as optical signals. Therefore, the scope of the claimed invention should be determined by the following claims.

What is claimed is:

1. A signal interconnection and routing system for protection routing of communications signals to termination devices, said termination devices being adapted to transmit and receive said communications signals, said system comprising:

a bi-directional signal primary connector to a first termination device for communicably interconnecting a communication signal to said first termination device;

a bi-directional signal protection connector to a second termination device for communicably interconnecting a communication signal to a second termination device;

a bi-directional primary signal media for carrying a primary communications signal;

a bi-directional signal protection mating connector adapted to communicably and mechanically interconnect to said signal protection connector to said second termination device;

a bi-directional signal primary mating connector adapted to communicably and mechanically interconnect to said primary connector to said first termination device, and being adapted to communicably interconnect to said primary signal media at a primary signal media port, and being adapted to communicably interconnect to a protection signal media at a protection signal media port, and having a bi-directional make-before-break signal routing device communicably disposed between said primary signal media port and said protection signal media port; and a bi-directional protection signal media for carrying a protection communications signal disposed between said protection signal media port of said primary connector and said protection mating connector to said second termination device such that at least three interconnection and signal routing states are possible, including:

a normal state whereby said primary communications signal is routed to said first termination device from said primary signal media through said primary mating connector when said primary connector and said primary mating connector are fully mated and engaged, a transitional state whereby said primary communications signal is interconnected to said first termination device and to said second termination device through said make-before-break signal routing device when said primary connector and said primary mating connector are partially mated and engaged, and a shunted state whereby said primary communications signal is interconnected to said second termination device through said make-before-break signal routing device when said primary connector and said primary mating connector are fully unmated and disengaged, such that said first termination device is replaceable or otherwise serviceable while said primary communications signal is routed to said second termination device.

2. A signal interconnection and routing system for protection routing of communications signals to termination devices as set forth in claim 1, wherein said primary signal comprises an electrical communications signal, and wherein said make-before-break signal routing device is adapted for switching electrical communications signals.

3. A signal interconnection and routing system for protection routing of communications signals to termination devices as set forth in claim 2, wherein said primary signal comprises a DS-1/T1 signal, and wherein said make-before-break signal routing device is adapted for switching DS-1/T1 electrical communications signals.

4. A signal interconnection and routing system for protection routing of communications signals to termination devices as set forth in claim 2, wherein said primary signal comprises a DS-3/T3 signal, and wherein said make-before-break signal routing device is adapted for switching DS-3/T3 electrical communications signals.

5. A signal interconnection and routing system for protection routing of communications signals to termination devices as set forth in claim 2, wherein said primary signal comprises a STS-1 electrical signal, and wherein said make-before-break signal routing device is adapted for switching STS-1 electrical communications signals.

6. A signal interconnection and routing system for protection routing of communications signals to termination devices as set forth in claim 2, wherein said primary signal comprises a STS-3 electrical signal, and wherein said make-before-break signal routing device is adapted for switching STS-3 electrical communications signals.

7. A signal interconnection and routing system for protection routing of communications signals to termination devices as set forth in claim 2, wherein said primary signal comprises a VT1.5 electrical signal, and wherein said make-before-break signal routing device is adapted for switching VT1.5 electrical communications signals.

8. A signal interconnection and routing system for protection routing of communications signals to termination devices as set forth in claim 2, wherein said primary signal comprises a 25M asynchronous transfer mode ("ATM") signal, and wherein said make-before-break signal routing device is adapted for switching 25M asynchronous transfer mode ("ATM") communications signals.

9. A signal interconnection and routing system for protection routing of communications signals to termination devices as set forth in claim 2, wherein said primary signal comprises a asynchronous digital subscriber line ("ADSL") signal, and wherein said make-before-break signal routing device is adapted for switching asynchronous digital subscriber line ("ADSL") communications signals.

10. A signal interconnection and routing system for protection routing of communications signals to termination devices as set forth in claim 2, wherein said primary signal comprises a high-speed digital subscriber line ("HDSL") signal, and wherein said make-before-break signal routing device is adapted for switching high-speed digital subscriber line ("HDSL") communications signals.

11. A signal interconnection and routing system for protection routing of communications signals to termination devices as set forth in claim 2, wherein said primary signal comprises a International Telecommunications Union ("ITU") E1 signal, and wherein said make-before-break signal routing device is adapted for switching E1 communications signals.

12. A signal interconnection and routing system for protection routing of communications signals to termination devices as set forth in claim 2, wherein said primary signal comprises a International Telecommunications Union ("ITU") E3 signal, and wherein said make-before-break signal routing device is adapted for switching E3 communications signals.

13. A signal interconnection and routing system for protection routing of communications signals to termination devices as set forth in claim 2, wherein said primary signal comprises a Japanese standard J1 signal, and wherein said make-before-break signal routing device is adapted for switching J1 communications signals.

14. A signal interconnection and routing system for protection routing of communications signals to termination devices as set forth in claim 2, wherein said primary signal comprises an local area network signal ("LAN"), and wherein said make-before-break signal routing device is adapted for switching LAN communications signals.

15. A signal interconnection and routing system for protection routing of communications signals to termination devices as set forth in claim 14, wherein said primary signal comprises an EtherNet local area network signal ("LAN"), and wherein said make-before-break signal routing device is adapted for switching EtherNet LAN communications signals.

16. A signal interconnection and routing system for protection routing of communications signals to termination devices as set forth in claim 14, wherein said primary signal comprises a FastEtherNet local area network signal ("LAN"), and wherein said make-before-break signal routing device is adapted for switching FastEtherNet LAN communications signals.

17. A signal interconnection and routing system for protection routing of communications signals to termination devices as set forth in claim 14, wherein said primary signal comprises a Gigabit EtherNet local area network signal ("LAN"), and wherein said make-before-break signal routing device is adapted for switching Gigabit EtherNet LAN communications signals.

18. A signal interconnection and routing system for protection routing of communications signals to termination devices as set forth in claim 14, wherein said primary signal comprises a TokenRing local area network signal ("LAN"), and wherein said make-before-break signal routing device is adapted for switching TokenRing LAN communications signals.

19. A signal interconnection and routing system for protection routing of communications signals to termination devices as set forth in claim 1, wherein said primary signal comprises an optical communications signal, and wherein said make-before break signal routing device is adapted for switching optical communications signals.

20. A signal interconnection and routing system for protection routing of communications signals to termination devices as set forth in claim 19, wherein said primary signal comprises an OC-1 optical communications signal.

21. A signal interconnection and routing system for protection routing of communications signals to termination devices as set forth in claim 19, wherein said primary signal comprises an OC-3 optical communications signal.

22. A signal interconnection and routing system for protection routing of communications signals to termination devices as set forth in claim 19, wherein said primary signal comprises an OC-12 optical communications signal.

23. A signal interconnection and routing system for protection routing of communications signals to termination devices as set forth in claim 19, wherein said primary signal comprises an OC-48 optical communications signal.

24. A signal interconnection and routing system for protection routing of communications signals to termination devices as set forth in claim 19, wherein said primary signal comprises an OC-192 optical communications signal.

25. A signal interconnection and routing system for protection routing of communications signals to termination devices as set forth in claim 19, wherein said primary signal comprises an OC-768 optical communications signal.

26. A signal interconnection and routing system for protection routing of communications signals to termination devices as set forth in claim 19, wherein said primary signal comprises a synchronous digital hierarchy ("SDH") communications signal.

27. A signal interconnection and routing system for protection routing of communications signals to termination devices as set forth in claim 26, wherein said primary signal comprises a STM-1 communications signal.

28. A signal interconnection and routing system for protection routing of communications signals to termination devices as set forth in claim 26, wherein said primary signal comprises a STM-4 communications signal.

29. A signal interconnection and routing system for protection routing of communications signals to termination devices as set forth in claim 26, wherein said primary signal comprises a STM-16 communications signal.

30. A signal interconnection and routing system for protection routing of communications signals to termination devices as set forth in claim 26, wherein said primary signal comprises a STM-64 communications signal.

31. A signal interconnection and routing system for protection routing of communications signals to termination devices as set forth in claim 1, further comprising a bi-directional one-of-two communications signal selector disposed between said primary connector and said first termination device, said one-of-two communications signal selector having a primary port for interconnecting to said primary signal media, a protection port for interconnecting to said protection signal media, a termination port for interconnecting to said first termination device, and a one-of-two selector control input, such that at least two additional primary signal routing states are possible:

said primary signal is routed from said primary signal media through said primary connector, through said primary mating connector, through said one-of-two signal selector to said first termination device when said primary connector and said primary mating connector are mated and engaged and said one-of-two selector control input is set to a normal mode, and said primary signal is routed from said primary signal media through said primary connector, through said primary mating connector, through said one-of-two signal selector to said second termination device via said protection signal media when said one-of-two selector control input is set to a normal mode, such that said one-of-two communications signal selector is available for shunting the primary signal to the second termination device over the protection signal media prior to disconnection of the primary mating connector from the primary connector, and following re-connection of the primary mating connector to the primary connector in order to allow the second termination device to become operatively engaged to said primary signal before disconnection of the primary connectors and to remain operatively engaged to said primary signal following reconnection of the primary connectors.

32. A signal interconnection and routing system for protection routing of communications signals to termination devices as set forth in claim 31 wherein said one-of-two signal selector comprises a manually operable selector.

33. A signal interconnection and routing system for protection routing of communications signals to termination devices as set forth in claim 31 wherein said one-of-two signal selector comprises a selector under machine control.

34. A signal interconnection and routing system for protection routing of communications signals to termination devices as set forth in claim 32 wherein said one-of-two signal selector comprises a selector adapted for switching electrical communications signals.

35. A signal interconnection and routing system for protection routing of communications signals to termination devices as set forth in claim 32 wherein said one-of-two signal selector comprises a selector adapted for switching optical communications signals.

\* \* \* \* \*